United States Patent
Buchter

(10) Patent No.: US 11,994,466 B2
(45) Date of Patent: May 28, 2024

(54) METHODS AND SYSTEMS FOR IDENTIFYING MATERIAL COMPOSITION OF MOVING OBJECTS

(71) Applicant: IRIDESENSE, Issy-les-Moulineaux (FR)

(72) Inventor: Scott Buchter, Espoo (FI)

(73) Assignee: IRIDESENSE, Issy-les-Moulineaux (FR)

( * ) Notice: Subject to any disclaimer, the term of this patent is extended or adjusted under 35 U.S.C. 154(b) by 846 days.

(21) Appl. No.: 16/981,844

(22) PCT Filed: Mar. 19, 2019

(86) PCT No.: PCT/EP2019/056843
§ 371 (c)(1),
(2) Date: Sep. 17, 2020

(87) PCT Pub. No.: WO2019/180021
PCT Pub. Date: Sep. 26, 2019

(65) Prior Publication Data
US 2021/0033533 A1 Feb. 4, 2021

Related U.S. Application Data

(60) Provisional application No. 62/745,370, filed on Oct. 14, 2018, provisional application No. 62/644,746, filed on Mar. 19, 2018.

(51) Int. Cl.
*G01C 3/08* (2006.01)
*B60W 30/095* (2012.01)
(Continued)

(52) U.S. Cl.
CPC ......... *G01N 21/55* (2013.01); *B60W 30/0956* (2013.01); *B60W 60/001* (2020.02);
(Continued)

(58) Field of Classification Search
CPC .......... G01N 21/55; G01N 2201/06113; G01S 17/894; G01S 17/86; G01S 7/4814;
(Continued)

(56) References Cited

U.S. PATENT DOCUMENTS 9,315,192 B1 * 4/2016 Zhu ................... B60W 30/09
2004/0119020 A1 * 6/2004 Bodkin ................ G01J 3/0208
250/353
(Continued)

FOREIGN PATENT DOCUMENTS

JP 2015034711 A 2/2015
JP 2016151565 A * 8/2016 ............. G01S 17/89
(Continued)

OTHER PUBLICATIONS

International Search Report dated Jun. 13, 2019 from International Application No. PCT/EP2019/056843, 11 pages.

*Primary Examiner* — Mark Hellner
(74) *Attorney, Agent, or Firm* — Daylight Law, P.C.

(57) ABSTRACT

A method for identifying a composition material of an object located in an environment surrounding at least one device, the object moving relative to the device, in which at least one sensor is mounted on the device and communicates with at least one central processing unit.

21 Claims, 7 Drawing Sheets

(51) Int. Cl.
*B60W 60/00* (2020.01)
*G01N 21/55* (2014.01)
*G01S 7/481* (2006.01)
*G01S 17/08* (2006.01)
*G01S 17/894* (2020.01)
*G06T 17/00* (2006.01)
*G06T 19/20* (2011.01)
*G06V 20/58* (2022.01)
*G01S 17/86* (2020.01)

(52) U.S. Cl.
CPC .......... *G01S 7/4814* (2013.01); *G01S 7/4816* (2013.01); *G01S 7/4817* (2013.01); *G01S 17/08* (2013.01); *G01S 17/894* (2020.01); *G06T 17/00* (2013.01); *G06T 19/20* (2013.01); *G06V 20/58* (2022.01); *B60W 2420/408* (2024.01); *B60W 2420/54* (2013.01); *G01N 2201/06113* (2013.01); *G01S 17/86* (2020.01); *G06T 2210/56* (2013.01); *G06T 2219/2004* (2013.01); *G06V 2201/07* (2022.01)

(58) Field of Classification Search
CPC .. G01S 7/4816; G01S 7/4817; B60W 60/001; B60W 2420/52; B60W 2420/54; B60W 2420/62; G06T 17/00; G06T 19/20; G06T 2210/56; G06T 2219/2004
See application file for complete search history.

(56) References Cited

U.S. PATENT DOCUMENTS

| | | |
|---|---|---|
| 2007/0024849 A1 | 2/2007 | Carrig et al. |
| 2015/0042645 A1 | 2/2015 | Kawaguchi et al. |
| 2017/0155225 A1 | 6/2017 | Villeneuve et al. |
| 2018/0284274 A1* | 10/2018 | LaChapelle ............. G01S 17/10 |
| 2019/0250622 A1* | 8/2019 | Nister .................. G06V 20/584 |

FOREIGN PATENT DOCUMENTS

| | | |
|---|---|---|
| JP | 2017166846 A | 9/2017 |
| WO | 2018091651 A1 | 5/2018 |

* cited by examiner

METHODS AND SYSTEMS FOR IDENTIFYING MATERIAL COMPOSITION OF MOVING OBJECTS

CROSS REFERENCE TO RELATED APPLICATIONS

This application is a 35 U.S.C. § 371 National Stage of International Application No. PCT/EP2019/056843, filed Mar. 19, 2019, which claims priority to U.S. Provisional Patent Application No. 62/644,746 filed Mar. 19, 2018 and U.S. Provisional Patent Application No. 62/745,370 filed Oct. 14, 2018, all of which are incorporated by reference in their entirety herein for all purposes.

BACKGROUND

The disclosure relates to methods and systems for identifying material composition of moving objects in a 3-dimensional (3D) volume or space.

The disclosure also relates to methods and systems for reconstructing 3-dimensional views of moving objects.

The disclosure also relates to the field of tridimensional sensors that are mounted on a device, such as a vehicle.

Providing a device with sensors that are able to generate tridimensional point clouds of the surroundings of the device has many interesting applications.

The generated point clouds may for instance be used to map an area travelled by a vehicle.

The generated point clouds may also be used to assist or to automate the driving system of the vehicle.

Examples of applications for driving assistance are object detection to trigger collision warning or collision avoidance, but the sensors may also be used in a fully autonomous vehicle, in order to automate the driving system of the vehicle.

However, in many situations, it may be necessary to determine the type of objects the vehicle may detect or may collide with, in order to control the vehicle with an appropriate driving response.

As an example, the vehicle may operate differently if the detected object is a child inadvertently crossing a street or a trash bin that has been left on the road on the path of the vehicle. Depending on the circumstances, the vehicle may decide or not to avoid a collision.

In order to differentiate between two different objects, it can be necessary to know the material composition of these objects. In the case of a child, the detected material composition will likely be the fabrics of his clothes or his skin, whereas in the case of a trash bin, the material composition will be rigid metal or plastic for instance.

To this end, it is known to use sensors that can emit a physical signal at multiple optical wavelengths. The sensors can then receive the signal that is reflected by the object for these different wavelengths. From this reflectivity response, it is possible to identify the material composition of the object by comparing the received reflectivity response with a database comprising reference reflectivity responses for known materials.

This however requires being able to compute the information received in real time, so that the appropriate command of the vehicle can be taken immediately or shortly after the object has been detected, and more particularly while the vehicle is moving.

Some prior art systems operate by emitting simultaneously at multiple optical wavelengths and by receiving successively the reflected response at different wavelengths.

However, such systems are too slow to be used in dynamic environments. Besides, if the vehicle is moving, each wavelength is received according to a different location of the receiver, and it becomes too complicated to aggregate the reflected signals as the number of wavelengths increases.

As another variant, some systems comprise a single emitter that can emit simultaneously at multiple wavelengths and a plurality of receivers, each receiver being configured to receive one reflected physical signal at a specific wavelength. In this way, the receivers when taken altogether can receive simultaneously the reflected signals for all the different emitted wavelengths.

However, such systems are complex since they require a large number of receivers. Besides, to perform effectively, the emitter and receivers must be aligned and positioned with a high degree of accuracy with regard to the vehicle. If one of the emitter or the receivers is inadvertently misaligned, the signal that is received may not be accurate and the vehicle may be unaware of a serious risk situation.

Having several receivers, each having a dedicated electronics, is a particularly costly solution.

Besides, each receiver is assigned to a specific wavelength or wavelength range. The system is therefore not easily adjustable, which makes it less flexible if other wavelengths have to be used in the future with the same receivers.

Finally, this is all the more difficult when the object to be detected moves into the environment of the vehicle. The object can then have a different location or orientation relative to the vehicle when successive physical signals are emitted.

SUMMARY

The present disclosure aims at improving this situation.

Specific embodiments of the present invention provide reflectivity response of an object at multiple optical wavelengths in real time of an object that moves into the environment of the device.

It is proposed a method for identifying a composition material of an object located in an environment surrounding at least one device, the object moving relative to the device, in which at least one sensor is mounted on the device and communicates with at least one central processing unit, wherein:

/A/ the sensor generates a point cloud frame of a continuous stream by emitting a physical signal at a first wavelength, wherein the point cloud frame comprises a set of data points, at least one data point comprising coordinates of the object in a local volume surrounding the sensor at time $t_j$ in a local coordinate system of the sensor, said data point also comprising an intensity value of a reflected physical signal corresponding to the emitted physical signal once reflected on the object, /B/ the central processing unit receives the point cloud frame and determines the coordinates of each data point of the point cloud frame in a global coordinate system of the environment surrounding the device, the intensity value being associated with the coordinates of each data point in the global coordinate system, /C/ the central processing unit determine the coordinates of the object at time $t_j$ in the global coordinate system, /D/ the central processing unit stores in a memory the coordinates of the object in the global coordinate system at time $t_j$, steps /A/ to /D/ are repeated with the sensor or another sensor generating another point cloud frame by emitting another physical signal at another wavelength, at time $t_{j+1}$, so that at least two intensity values are associated to coordinates of the object in the global coordinate system at two different times, /E/ the central processing unit determines a reflectivity response of the object from the at least two intensity values, and /F/ the central processing unit identifies the composition material of the object.

The following features can be optionally implemented, separately or in combination one with the others:

The central processing unit determines the coordinates of each data point of the point cloud frame in the global coordinate system of the environment surrounding the device by:

comparing the point cloud frame with a global cumulated tridimensional map of the environment to determine an aligned point cloud frame in the global coordinate system, and updating the global cumulated tridimensional map by merging the aligned point cloud frame with the global cumulated tridimensional map.

The central processing unit determines the coordinates of the object at time $t_j$ in a global coordinate system by:

comparing the point cloud frame with a global cumulated tridimensional map of the environment to determine an aligned point cloud frame in the global coordinate system, and determining a set of data points of the point cloud frame that cannot be aligned in the global coordinate system, so that this set of data points corresponds to the moving object.

The method comprises an additional step of obtaining a three-dimensional reconstruction of the object from the coordinates of the object in the global coordinate system and generated at least two different times, The sensor comprises at least one emitter and at least one receiver, the emitter being configured to emit a physical signal and the receiver being configured to receive the emitted physical signal once reflected on the object.

The sensor comprises the emitter and the receiver as a single unit.

The central processing unit identifies the composition material of the object by comparing the reflectivity response determined at step /E/ with reference reflectivity responses of known materials stored in a library.

The wavelengths of the physical signals emitted for the point cloud frames are selected in a random manner.

The wavelengths of the physical signals emitted for the point cloud frames are selected in a predetermined order.

The device comprises a plurality of sensors, wherein the sensors can respectively generate a point cloud frame by emitting a physical signal at a wavelength comprised in different spectral domains.

The sensors all communicate wirelessly with the central processing unit.

A point cloud frame corresponds to a full scan of the local volume of the sensor.

The coordinates of the object in the local coordinate system of the sensor comprises two angular coordinates and one radial coordinate.

The radial coordinate corresponds to the distance from the sensor to the data point, the distance being computed by comparing timing of the emitted physical signal and the reflected physical signal.

Steps /A/ to /D/ are repeated at least four times, so that at least four intensity values are associated to coordinates of the object in the global coordinate system.

The physical signal is a laser signal.

The device is a vehicle able to move in the environment.

In another aspect, it is proposed a system for identifying the composition material of an object located in an environment surrounding at least one device, the object moving relative to the device, the system comprising:

a plurality of sensors configured to be mounted on said at least one device, each sensor being configured to generate a continuous stream of point cloud frames, in parallel and asynchronously with the other sensors, by emitting a physical signal at a first wavelength, wherein the point cloud frame comprises a set of data points, each data point comprising coordinates of the object in a local volume of the environment surrounding the sensor at time $t_j$ in a local coordinate system of the sensor, each data point also comprising an intensity value of a reflected physical signal corresponding to the emitted physical signal once reflected on the object, a central processing unit configured to communicate with each sensor to continuously receive the continuous streams from the sensors, determine the coordinates of each data point of the point cloud frame in a global coordinate system of the environment surrounding the device, determine the coordinates of the object in the global coordinate system at the time $t_j$, and store in a memory the intensity value and the coordinates in the global coordinate system, the central processing unit being configured to determine a reflectivity response of the object from the intensity values and to identify the composition material of the object.

In another aspect, it is proposed an autonomous or semi-autonomous vehicle comprising a system according to the disclosure.

In another aspect, a non-transitory computer readable storage medium is proposed, having stored thereon a computer program comprising program instructions, the computer program being loadable into a central processing unit of the system according to the disclosure and configured to cause the central processing unit to carry out the steps of a method according to the disclosure, when the computer program is run by the central processing unit.

Other features, details, and advantages will be shown in the following detailed description and on the figures.

BRIEF DESCRIPTION OF THE DRAWINGS

FIG. 2 for identifying the material composition of an object located in the environment of the vehicle.

DETAILED DESCRIPTION

Figures and the following detailed description contain, essentially, some exact elements. They can be used to enhance understanding the disclosure and, also, to define the disclosure if necessary.

Vehicle

The disclosure relates to a device. The device is advantageously movable into an environment E. The device can be any type of device, such as a handheld device, or it can be mounted on a relatively bigger element.

According to an embodiment, the device can be hand-carried by a person for instance.

According to another particular and non-limitative embodiment detailed below, the device is a vehicle 1 in an environment E.

The vehicle can be any type of vehicle configured to move in the environment E. Vehicles includes motor vehicles (motorcycles, cars, trucks, and buses), railed vehicles (trains, trams), watercraft (ships, boats), amphibious vehicles (screw-propelled vehicle, hovercraft), aircraft (airplanes, helicopters, drones) and spacecraft.

Figure 1:
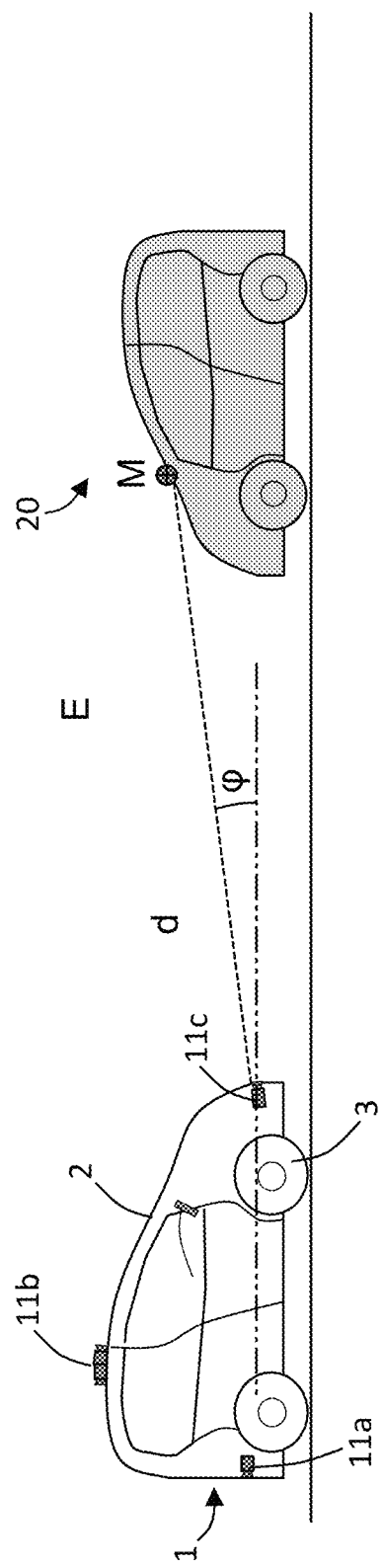
FIG. 1 is a schematic side view of a vehicle in an environment comprising a moving object, illustrated by a car, according to an embodiment of the disclosure.
Figure 2:
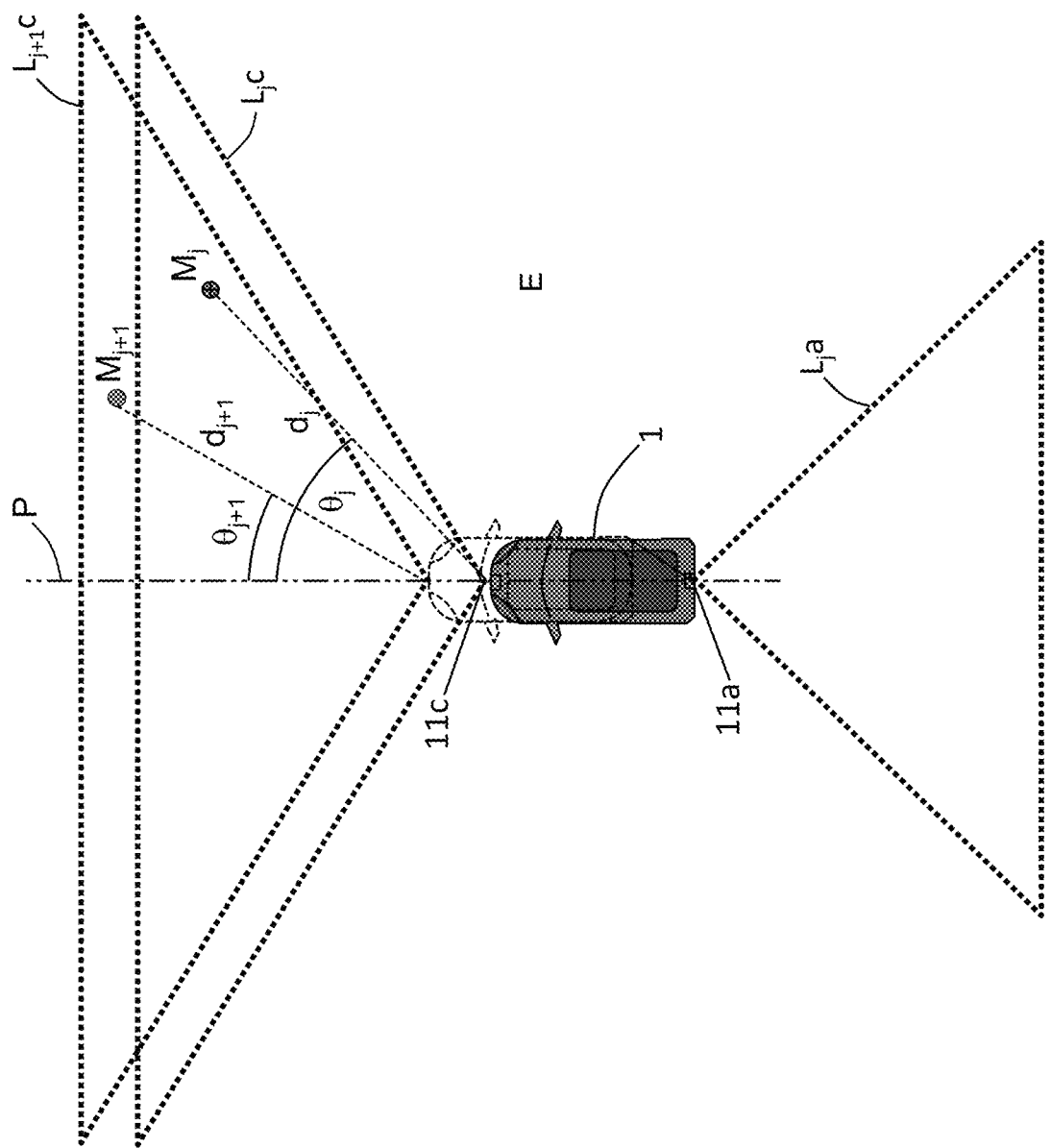
FIG. 2 is a schematic top view of the vehicle of FIG. 1.

More particularly, FIG. 1 and FIG. 2 illustrate a vehicle 1 according to one embodiment of the disclosure.

The vehicle 1 is a wheeled vehicle whose direction can be controlled to follow a specific path P. It should be noted that the disclosure can be applied to a wide range of wheeled vehicles, rear-wheel-steering car, trucks, motorcycles and the like.

As illustrated on FIG. 1, the vehicle 1 is provided with a body 2, bearing at least one wheel 3, which delimits an inside of the vehicle from the environment E of the vehicle 1.

Sensor

The vehicle 1 comprises a system 10 for identifying a material composition of an object 20 located in the environment E of the vehicle 1.

The system 10 comprises at least one sensor 11. Advantageously, the system 10 comprises a plurality of sensors 11a, 11b, 11c that are mounted on or inside the body 2 of the vehicle 1.

For instance, the vehicle 1 may be provided with three sensors 11a, 11b, 11c respectively mounted on the back, on the top and the front of the vehicle 1, as illustrated on FIG. 1. However, the vehicle 1 may comprise only two sensors 11 or a higher number of sensors 11.

Each sensor 11 generates a continuous stream of point cloud frames of a local volume $L_j$ surrounding the sensor 11.

By "point cloud frame", it is understood a frame generated at a specific time, or during a short interval of acquisition.

By "continuous stream of point cloud frames", it is understood a succession of point cloud frames, periodically generated or not, organized in a stream of data.

For instance, the sensor 11 is able to periodically generate point cloud frames with a given framerate of the continuous stream. The framerate can be equal or higher than 20 Hz (Hertz). The framerate can also be lower, for instance lower than 20 Hz, even lower than 10 Hz, or even lower than 5 Hz.

In the specification below, a point cloud frame generated by a sensor 11 is referred to as $PCF_j$, the time of acquisition of this point cloud frame $PCF_j$ is referred as $t_j$ and a local volume $L_j$ of the sensor 11 at said time $t_j$ is referred as $L_j$. In these references, the subscript j is the index of the frame in the continuous stream ST, j increasing over time with each newly generated frame.

The point cloud frames $PCF_j$ can also be generated in parallel and asynchronously with other point cloud frames from other sensors 11.

By "in parallel and asynchronously", it is understood that the sensors 11 are in general unaware of each other and the generation of point cloud frames $PCF_j$ by the sensors 11 are not specifically synchronized together.

Thus, point cloud frames $PCF_j a$, $PCF_j b$, $PCF_j c$ of respective continuous streams STa, STb, STc of the sensors 11a, 11b, 11c may be generated at different respective times $t_j a$, $t_j b$, $t_j c$.

Point Cloud Frame

Each point cloud frame $PCF_j$ of a stream ST comprises a set of data points $M_i$ in a local coordinate system LCS of the sensor 11. A data point $M_i$ corresponds to a tridimensional portion, such as a voxel, of the local volume $L_j$.

A point cloud frame can comprise a high number of data points, such as 10,000 or even 100,0000 data points, or even higher. The number of data points can vary, depending on the desired resolution when scanning the environment E of the vehicle 1 with the sensor 11. The number of data points of a point cloud frame may also vary according to the framerate that is used; it the framerate is high, the number of data points of a point cloud frame that is needed may be lower.

More precisely, a data point $M_i$ can correspond to an object 20, or a part of an object 20, located in the environment E of the vehicle 1.

The local coordinate system LCS is a coordinate system related to the vehicle 1, and more particularly to the sensor 11, for instance with an origin point located at the sensor location. The local coordinate system LCS may be a cartesian, cylindrical or polar coordinate system.

Each data point $M_i$ comprises three-dimensional coordinates $(\varphi_i, \theta_i, d_i)_{LCS}$, in particular in the local coordinate system LCS of the sensor.

The coordinates $(\varphi_i, \theta_i, d_i)_{LCS}$ are representative of the location of the data point $M_i$ in the local volume $L_j$ of the sensor 11 at time $t_j$.

Each data point $M_i$ also comprises an intensity value $I_i$ associated with the coordinates $(\varphi_i, \theta_i, d_i)_{LCS}$ of the data point $M_i$.

The intensity value $I_i$ is representative of a physical feature associated to the object 20 located at the coordinates $(\varphi_i, \theta_i, d_i)_{LCS}$ of the data point $M_i$, as detailed below.

The object 20 is movable or moving in the environment E of the vehicle 1.

By "movable or moving", it is understood that the object 20 can move or moves relative to the vehicle 1. Also, the object 20 can move while the vehicle 1 is motionless, or the object 20 can move while the vehicle 1 is also moving. In the latter case, the object 20 moves relative to a reference frame of the vehicle 1.

By "movable or moving", it is also understood that the object 20 can have any path in the environment E. For instance, the object 20 can have a straight or curved path, in any direction. The object can also pivot or change orientation.

However, given the fact that a point cloud frame is generated during a very short time of acquisition, it is considered that the object remains still relative to the vehicle 1 during such acquisition time.

Such object 20 can be of various types. As illustrated on FIG. 1, non-limitative examples of objects 20 include animals, pedestrians or vehicles that can move into the environment E of the vehicle 1.

This list is non-limitative and any object likely to be movable can be part of the present disclosure.

Generation of a Point Cloud Frame

To generate a continuous stream ST of point cloud frames $PCF_j$, the sensor 11 comprises at least one emitter 14 and at least one receiver 15.

Figure 3:
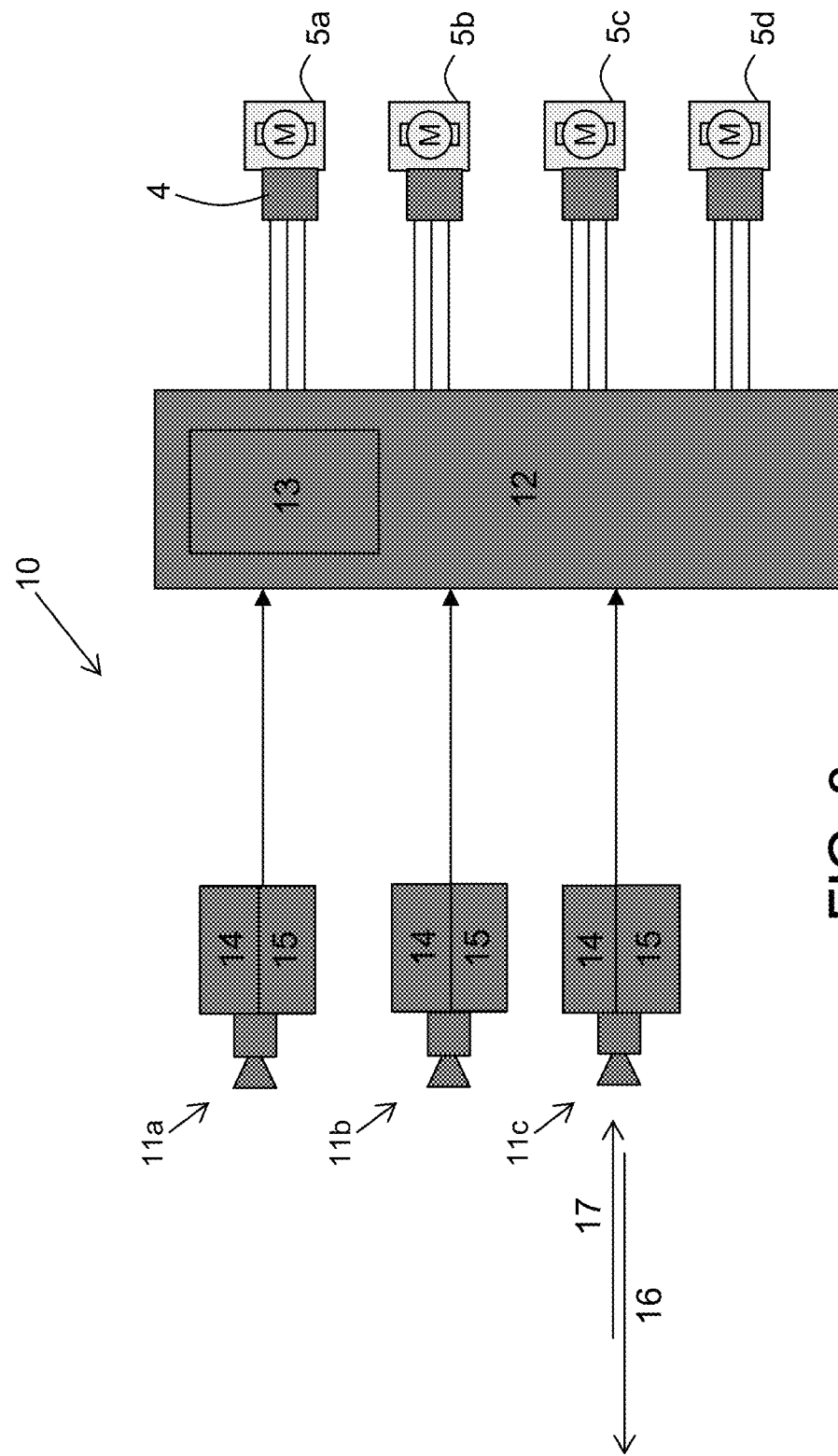
FIG. 3 is a schematic view of a system of the vehicle of FIG. 1.

Advantageously, the sensor 11 comprises a single emitter 14 and a single receiver 15, preferably as a single unit, as illustrated on FIG. 3.

The emitter 14 is configured to emit a physical signal 16.

The physical signal can be a light beam, an electromagnetic wave, or an acoustic wave.

The receiver 15 is configured to receive a reflected physical signal 17, corresponding to the emitted physical signal 16 once reflected in the environment E of the vehicle 1.

By "reflected", it is understood either specular (mirror-like) or diffuse reflection.

A sensor 11 may for instance comprise a laser rangefinder such as a light detection and ranging (Lidar) module, a radar module, an ultrasonic ranging module, a sonar module, a ranging module using triangulation or any other element able to generate a point cloud frame.

Coordinates

A point cloud frame $PCF_j$ corresponds to a full scan of the local volume $L_j$ of the sensor 11.

By "full scan of the local volume", it is understood that the sensor 11 has covered its complete field of view. For instance, the emitter 14 emits a physical signal that is deflected by a moving mirror rotating along two directions. After a full scan of the local volume, the moving mirror of the sensor 11 is back to its original position and ready to start a new period of rotational movement. A full scan of the local volume $L_j$ by the sensor 11 is thus the three-dimensional equivalent of an image acquired by a bi-dimensional camera.

As illustrated on FIG. 1 and FIG. 2, the sensor 11 can operate a full scan by moving along two angular directions $\theta$, $\varphi$ in the local coordinate system LCS of the sensor 11.

According to this embodiment, each data point Mi of a point cloud frame $PCF_j$ thus comprises two angular coordinates $\theta_i$, $\varphi_i$.

The coordinates of a data point $M_i$ in the local coordinate system LCS also comprise a radial coordinate, corresponding to the distance $d_i$ from the sensor 11 to the data point $M_i$.

Said distance $d_i$ may be computed by comparing timing of the emitted physical signal 16 and the reflected physical signal 17, for instance by comparing the time or the phases of emission and reception between the emitter 14 and the receiver 15. As an example, a time to digital converter (TDC) can measure the time of flight (TOF) of the physical signal in order to provide the distance $d_i$ to the point $M_i$.

Intensity Value

Each point cloud frame $PCF_j$ of a continuous stream ST is generated at a given wavelength $\lambda_{ej}$.

To this end, the emitter 14 of a sensor 11 can emit the physical signal in various spectral domains. The physical signal 16 can belong to the electromagnetic spectrum, such as ultraviolet, visible, or infrared spectrum.

More particularly, the emitter 14 of the sensor 11 is configured to emit the physical signal 16 at a single wavelength $\lambda_{ej}$ or around a single wavelength $\lambda_{ej}$, for each point cloud frame $PCF_j$.

By "around a single wavelength", it is understood that although the physical signal 16 is considered to be emitted at a single wavelength, it can have a certain spectral width or range around said single wavelength $\lambda_{ej}$ inherent to the emitter 14 used.

Also, the continuous stream ST can comprise a first point cloud frame $PCF_1$ generated at a first wavelength $\lambda_1$, a second point cloud frame $PCF_2$ generated at a second wavelength $\lambda_2$, a third point cloud frame $PCF_3$ generated at a third wavelength $\lambda_3$, etc.

According to an embodiment, the wavelengths $\lambda_{ej}$ of the emitted physical signal 16 for each point cloud frame $PCF_j$ can all be different or not.

According to an embodiment, the wavelengths $\lambda_{ej}$ of the emitted physical signal 16 for each point cloud frame $PCF_j$ can be selected in a predetermined order.

For instance, the wavelength $\lambda_{ej}$ of the emitted physical signal 16 for a point cloud frame $PCF_j$ can be chosen incrementally when compared with the wavelength $\lambda_{ej-1}$ of the emitted physical signal 16 for the previous point cloud frame $PCF_{j-1}$.

As a variant, the wavelengths $\lambda_{ej}$ of the emitted physical signal 16 for each point cloud frame $PCF_j$ can be selected in a random manner.

The receiver 15 is configured to receive the reflected physical signal 17 for each data point $M_i$ of the point cloud frame $PCF_j$ on a wavelength range $\Delta\lambda_r$.

The wavelength range $\Delta\lambda_r$ of the reflected physical signal 17 can for instance be comprised between 10 nm (nanometers) to and 250 nm.

The reflected physical signal 17 can be received over a time interval.

From the reflected signals 17 received by the receiver 15, it is possible to determine the intensity value $I_i$ associated with the coordinates $(\varphi_i, \theta_i, d_i)_{LCS}$ of each data point $M_i$ of point cloud frame $PCF_j$ for a physical signal 16 emitted at a given wavelength $\lambda_{ej}$.

The intensity value $I_i$ may correspond to the maximum amplitude of the received reflected physical signal 17 or to the attenuation of the physical signal 16 for a given wavelength. However, other calculations or measures of the intensity values are possible.

Also, the intensity value provides information on the reflectivity response at the data point $M_i$ for a physical signal 16 emitted at the wavelength $\lambda_{ej}$.

Since the sensor 11 is mounted on a moving vehicle 1, the environment E surrounding the vehicle 1 changes over time. A point cloud frame $PCF_j$ generated by a sensor 11 at a time $t_j$ comprises a full scan of a local volume $L_j$ of the sensor 11 that is different from, but may overlap with, another point cloud frame $PCF_{j+1}$ generated by the same sensor 11 at a different time $t_{j+1}$ or generated by another sensor 11.

Figure 4:
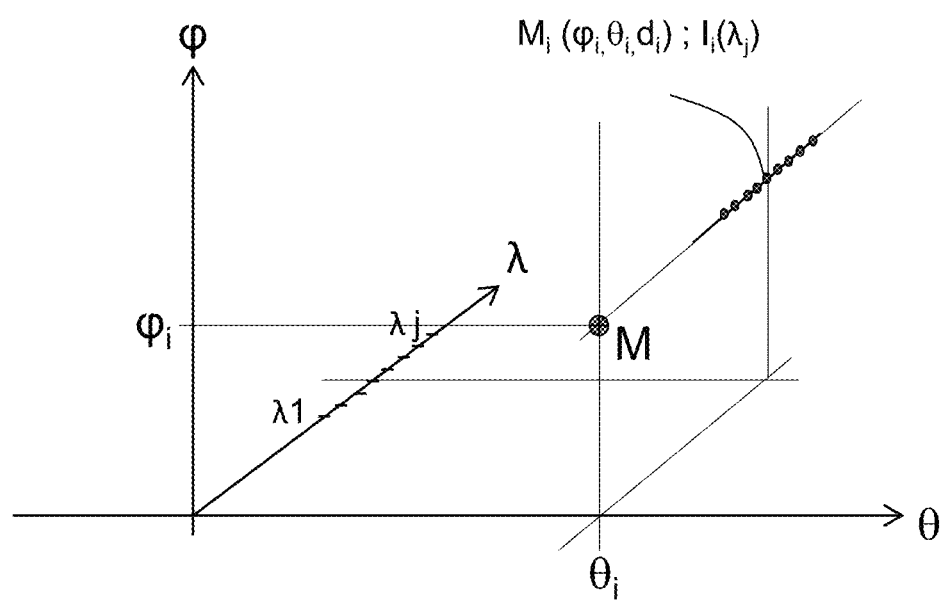
FIG. 4 is a graphic representation of a full scan of a local volume of a sensor of the vehicle of FIG. 1 and FIG. 2 at several different wavelengths.

For instance, as illustrated on FIG. 2 and FIG. 4, coordinates $(\varphi_i, \theta_i, d_i)_{LCS}$ of a the data point $M_i$ in the local coordinate system LCS of the sensor 11 will be different when scanning a same given data point M at two different times $t_j$, $t_{j+1}$.

It is thus possible to obtain different intensity values for a same object 20 when belonging to different point cloud frames, each point cloud frame being generated with physical signals 16 emitted at different wavelengths $\lambda_{ej}$.

However, one needs to ascertain the fact that the intensity values obtained with different point cloud frames correspond in fact to the same moving object 20.

It is thus necessary to be able to correlate the point cloud frames $PCF_j$, $PCF_{j+1}$ generated at different times $t_j$, $t_{j+1}$ by the one or several sensors 11, and to aggregate the intensity values $I_i$ representative of the reflected signals 17 of the same object 20 for physical signals 16 emitted at different wavelengths $\lambda_{ej}$.

Moving Object

The system 10 is able to determine that a set of data point of a point cloud frame, corresponding to part or the totality of the object 20, is moving in the environment E.

For instance, the system 10 can observe that a local volume $L_j$ of the sensor 11, that was clear from any object at a time $t_j$ (and thus clear from any data point), now comprises a set of data points at another time $t_{j+1}$. The system then deduces that the object 20 observed in said local volume $L_j$ at time $t_{j+1}$. is a moving object that has moved between times $t_j$ and $t_{j+1}$.

Other means is possible to determine that a set of data points corresponds to a moving object 20. To this end, the system 10 can be used. Alternatively, any other external element, such as another light source, can be used for instance.

Central Processing Unit

The system 10 further comprises a central processing unit 12 connected to the sensor 11 or the plurality of sensors 11.

The central processing unit 12 can be integrated inside the sensors 11 as a single unit or alternatively, can be a distinct unit secured inside a vehicle 1. In some embodiments, the central processing unit 12 may be a part of the vehicle processing unit.

The vehicle may be able to operate a self-driving or a driving assistance algorithm to drive or assist the driving of the vehicle 10, in particular by using the information provided by the system 10. To this end, the system 10 may control several actuators 4 connected to several vehicle elements 5a, 5b, 5c, 5c, such as the drivetrain, the brakes, etc.

The central processing unit 12 may communicate with the sensors 11 by wireless communication, such as radio or optic communications, or by wired communications, for instance if the central processing unit 12 and the sensor 11 are mounted on the same vehicle 1. The central processing unit 12 may communicate with the sensors 11 by using some intermediary element, in particular for long range communication.

The central processing unit 12 is configured to continuously receive the continuous stream ST from the sensor 11.

By "continuously receive", it is understood that every time a sensor 11 has generated a new point cloud frame or a short sequence of point cloud frames, said point cloud frame or short sequence is sent to the central processing unit 12 while the vehicle is moving.

The central processing unit 12 stores the continuous stream in a memory 13. The memory 13 might be integrated in the central processing unit 12.

The central processing unit 12 is configured to dynamically determine the coordinates $(\varphi_i, \theta_i, d_i)_{GCS}$ of each data point $M_I$ of a point cloud frame $PCF_j$ in a global coordinate system GCS of the environment E surrounding the vehicle 1.

The global coordinate system GCS may in particular be independent of the vehicle 1 and of the movement of the vehicle 1. The global coordinate system GCS can for instance relate to an International Terrestrial Reference Frame (ITRF).

Alternately, the global coordinate system GCS may also be dependent on the local reference frame of the vehicle 1, for instance by being defined from the local coordinate system LCS associated to a sensor 11.

By "dynamically determine the coordinates", it is understood that the determination of the coordinates $(\varphi_i, \theta_i, d_i)_{GCS}$ of each data point $M_I$ of a point cloud frame $PCF_j$ in the global coordinate system GCS is performed while the vehicle 1 is moving, advantageously before generating the next point cloud frame by the sensor 11.

The central processing unit 12 is then configured to determine a reflectivity response 30 of the object 20 and to identify the material composition of the object 20 located in the environment E from the reflectivity response 30.

By "material composition", it is understood the composition of the material forming the object 20 or the surface of the object 20.

Non limitative examples of material composition include metal, plastics, glass, skin, plant material, ice, snow, asphalt, cement, water etc. More generally, material composition can be of any object that is located in the environment E of the vehicle 1.

Method for Identifying Material Composition

Figure 7:
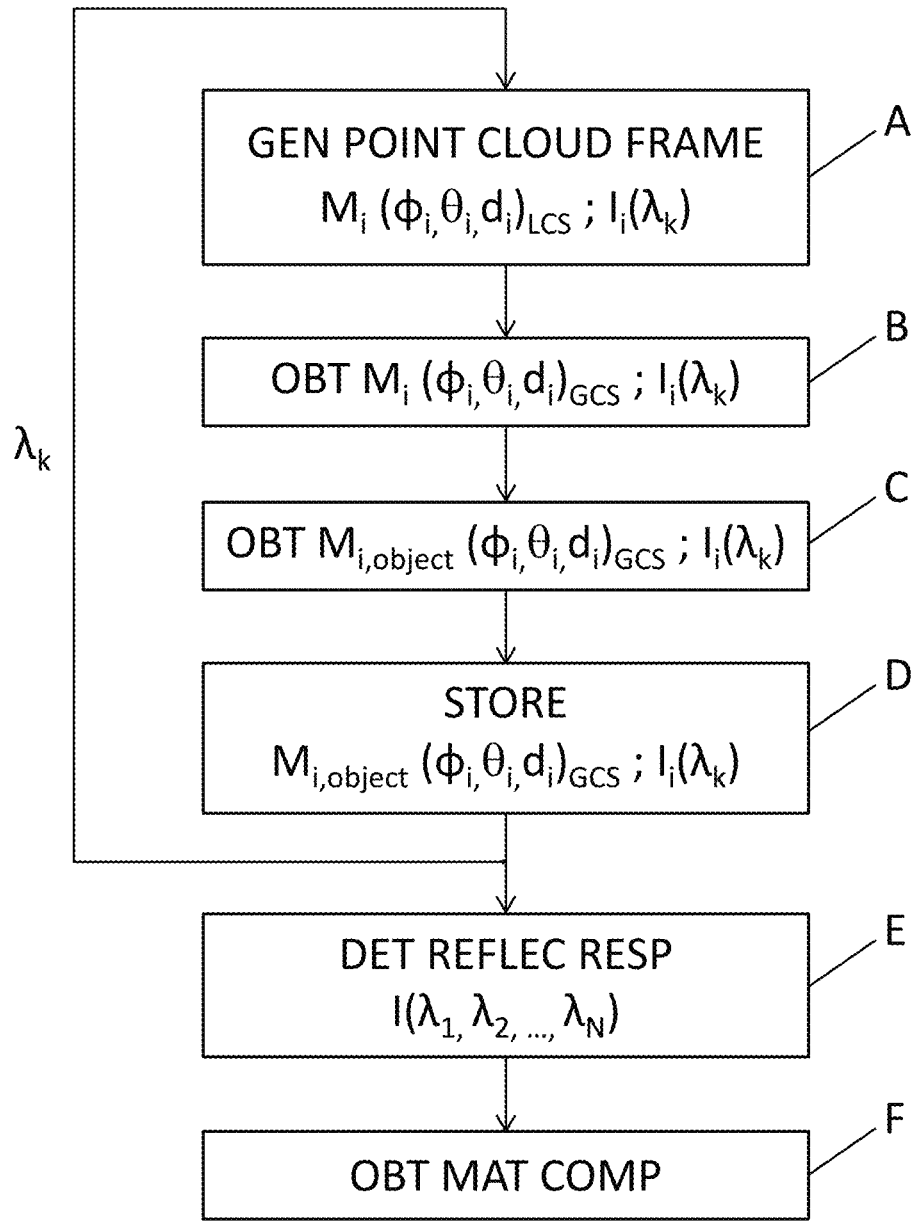
FIG. 7 is a flowchart showing a method for dynamically identifying a material composition of an object in the environment of the vehicle according to an embodiment of the disclosure.

The method for identifying material composition of objects in a 3-dimensional volume or space will now be described in more details in relation with FIG. 7.

In a first step A, a point cloud frame $PCF_j$ of a continuous stream ST is generated by emitting a physical signal 16 at a given wavelength $\lambda_{ej}$.

The point cloud frame $PCF_j$ comprises a set of data points $M_i$, in the local coordinate system LCS.

A data point $M_i$ comprises coordinates $(\varphi_i, \theta_i, d_i)_{LCS}$ of an object 20 in a local volume $L_j$ at time $t_j$ in a local coordinate system LCS.

The data point $M_i$ also comprises an intensity value $I_i$ representative of the physical signal 17 reflected on the object 20.

In a second step B, from the point cloud frame $PCF_j$, the central processing unit 12 dynamically determines the coordinates $(\varphi_i, \theta_i, d_i)_{GCS}$ of the data point $M_i$ of the point cloud frame $PCF_j$ in the global coordinate system GCS.

To this end, the central processing unit 12 determines an aligned point cloud frame $PCF_{j,align}$ in the global coordinate system GCS by comparing the point cloud frame $PCF_j$ with a global cumulated tridimensional map CM.

The global cumulated tridimensional map CM is also sometimes referred as a global tridimensional map, a global 3D map or a 3D map. These expressions cover the same concept and the same feature of the disclosure.

The global cumulated tridimensional map CM is a map of the environment E of the vehicle 1 in the global coordinate system GCS.

If the global cumulated tridimensional map CM of the environment does not exist yet or contain no data, the second step B comprises the operation of creating the global cumulated tridimensional map CM from the point cloud frame $PCF_j$.

For instance, the point cloud frame $PCF_j$ may be the first received point cloud frame $PCF_1$ from a sensor 11. A global coordinate system GCS of the environment may then for instance be defined from the local coordinate system LCS associated to the sensor 11.

Alternatively, if the global cumulated tridimensional map CM of the environment already exists and contains some data, the second step B comprises the operation of determining an aligned point cloud frame $PCF_{j,align}$ in the global coordinate system GCS of the environment E of the vehicle.

The alignment may be performed for instance by using image registration, or Simultaneous Localization and Mapping (SLAM) such as the method disclosed in the patent document WO2018/091651.

According to this method, determining an aligned point cloud frame $PCF_{j,align}$ is performed by comparing the generated point cloud frame $PCF_j$ with the global cumulated tridimensional map CM of the environment E.

The aligned point cloud frame $PCF_{j,align}$ may be computed only from the point clouds generated by the sensor or the plurality of sensors 11 and without additional positioning information.

By "without additional positioning information", it is in particular meant that the computation of the aligned point cloud frame $PCF_{j,align}$ does not require other input data than the point cloud frames generated by the sensors 11 and the global cumulated tridimensional map CM. For instance, no additional positioning or orientation element, such as a GPS or an accelerometer, is required. Moreover, no assumption has to be made on the location or movement of the sensor.

The central processing unit 12 tries to align said point cloud frame $PCF_j$ so that at least a portion of the aligned point cloud frame matches at least a portion of the global cumulated tridimensional map CM.

This can be accomplished by comparing said point cloud frame $PCF_j$ with the global cumulated tridimensional map CM of the environment E.

The global cumulated tridimensional map CM is then updated by merging said aligned point cloud frame $PCF_{j,align}$ with the global cumulated tridimensional map CM.

More precisely, if the point cloud frame $PCF_j$ can be aligned with at least a portion of the global cumulated tridimensional map CM of the environment E, the aligned point cloud frame $PCF_{j,align}$ is merged with said at least one portion of the global cumulated tridimensional map CM.

From the aligned point cloud frame $PCF_{j,align}$ in the global cumulated tridimensional map CM, the central processing unit can determine the coordinates $(\varphi_i, \theta_i, d_i)_{GCS}$ of the data points $M_i$ of the object in the global coordinate system GCS.

In a third step C, the central processing unit 12 stores in the memory 13 the intensity value $I_i$ and the coordinates $(\varphi_i, \theta_i, d_i)_{GCS}$ of the data point $M_i$ in the global coordinate system GCS.

When aligning the subsequent point cloud frame with the global cumulated tridimensional map CM of the environment E, a portion of data points of the aligned point cloud frame can match the global cumulated tridimensional map CM. This portion of data points corresponds to a part of the environment E that has not move with time (such as mapping of buildings, road, etc.).

However, the set of data points corresponding to the object 20 cannot match the global cumulated tridimensional map CM. This is due to the fact that the global cumulated tridimensional map CM was created from earlier point cloud frames when the moving object was not present, or was located elsewhere, in the environment E.

The set of data points corresponding to the object 20 cannot therefore be aligned with the data points from the rest of the environment E.

It is thus possible to identify in a step D which set of data points for each point cloud frame correspond in fact to the moving object 20.

By doing so for each point cloud frame, the system 10 can then determine the coordinates $(\varphi_i, \theta_i, d_i)_{GCS}$ of the set of data points $M_i$ of the object 20 in the global coordinate system GCS at a given time. It is thus possible to know the location and/or orientation of the object 20 at different times for the respective point cloud frames.

From these locations and/orientation, it is possible to derive new kinematic information about the object 20, such as its trajectory, its speed, etc.

Steps A to D are repeated with one of the sensors 11 generating a second point cloud frame of a continuous stream by emitting the physical signal at a second wavelength $\lambda_{J+1}$.

More precisely, steps A to D can be repeated several times, and more particularly more than two times, so that several point cloud frames are generated by emitting the physical signal at several other wavelengths.

Some of the subsequent point cloud frames can be emitted by the same sensors or by several sensors.

Given the fact that steps A to D are repeated, at least two, and preferably a higher number of intensity values can be associated to the same object 20 in the global coordinate system GCS.

If the point cloud frames are emitted by several sensors, the wavelengths of the corresponding emitted physical signals can belong to different spectral domains, which can be useful to acquire intensity values for various types of physical signals (infrared, visible light, ultraviolet, etc.).

Also, in a step E, the central processing unit 12 determines the reflectivity response 30 of the object 20 from the intensity values acquired for the object 20 with each point cloud frame $PCF_j$.

Figure 5:
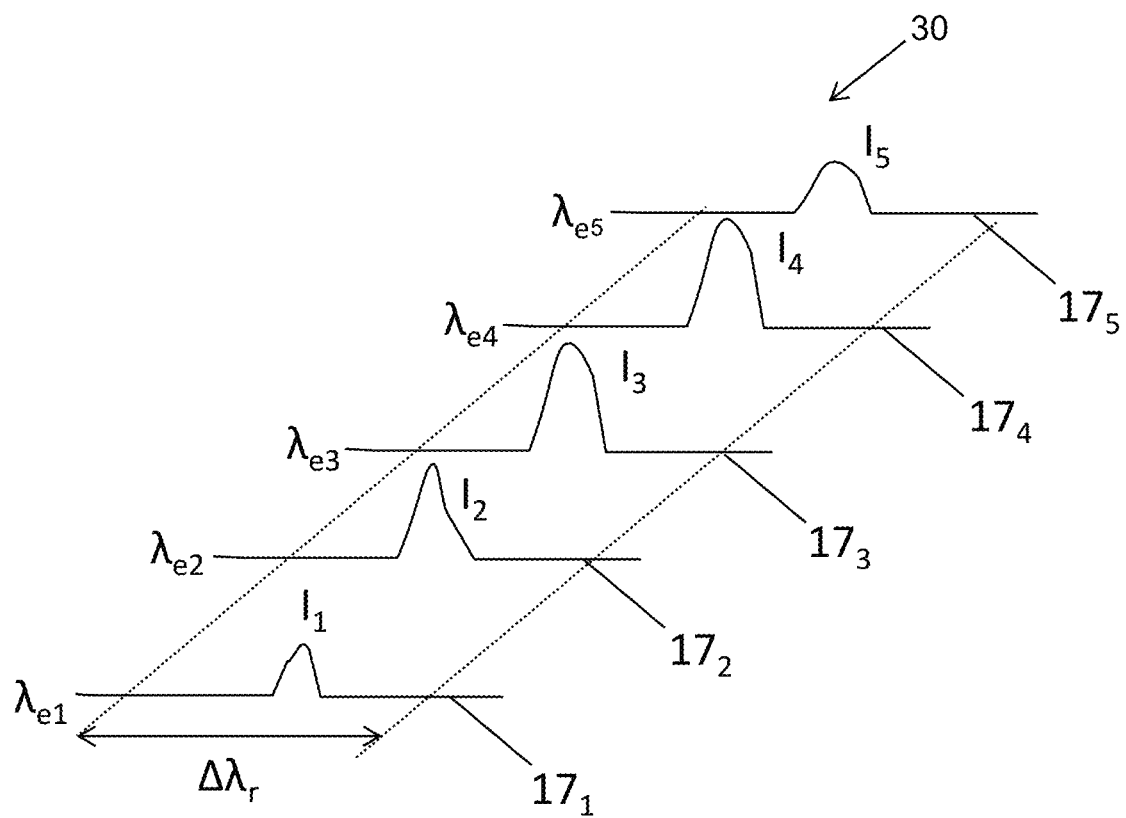
FIG. 5 is a graphic representation of the reflected signals received for each physical signal emitted at several different wavelengths, the reflected signals being aggregate to obtain a reflectivity response of an object.

As illustrated on FIG. 5, the reflectivity response 30 is obtained by aggregating the intensity values I acquired at several different wavelengths $\lambda_{ej}$.

More precisely, in the example of the FIG. 5, the reflectivity response 30 is obtained from the reflected physical signals $17_1, 17_2, 17_3, 17_4, 17_5$ corresponding to physical signals emitted at several different wavelengths $\lambda_{e1}, \lambda_{e2}, \lambda_{e3}, \lambda_{e4}, \lambda_{e5}$ once reflected on the object 20. From these reflected physical signals $17_1, 17_2, 17_3, 17_4, 17_5$, intensity values $I_1, I_2, I_3, I_4, I_5$, such as the maximum amplitude value, can be obtained.

In a step F, the central processing unit 12 identifies the material composition of the object 20.

In this step F, the reflectivity response 30 can then be compared with reference reflectivity responses of known materials stored in a library. The library can be stored in the memory 13 of the central processing unit 12.

Method for 3D Reconstructing the Moving Object

As the object 20 is moving relative to the vehicle 1, one or several sensors 11 of the vehicle 1 may be able to acquire sets of data points from the object 20 according to different view angles. Several point cloud frames $PCF_j$ permit to obtain these different view angles.

Figure 6:
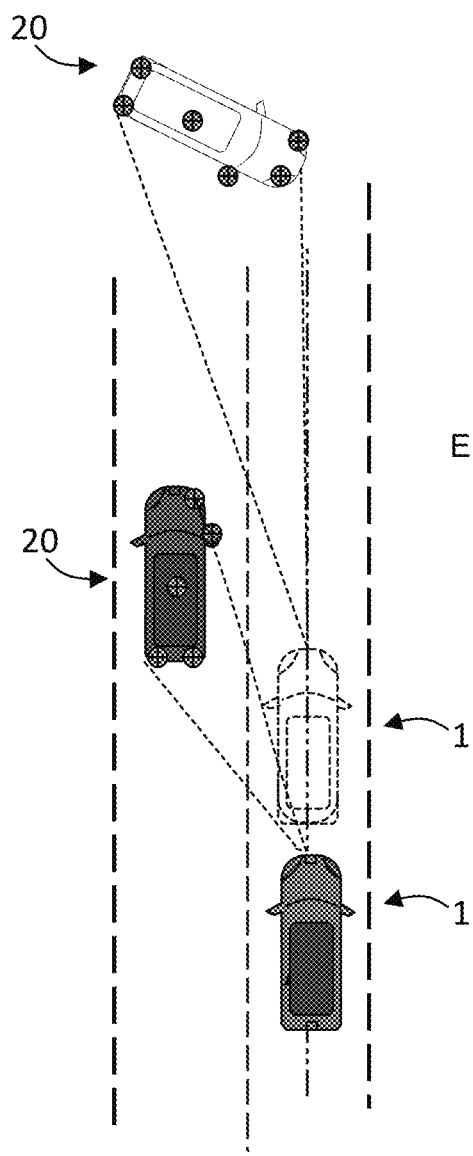
FIG. 6 is a schematic view of the device and an object illustrated by a car, the device generating two point cloud frames at two different times while the object is moving relative to the device.

As an example, FIG. 6 illustrates a car 20 that moves relative to the vehicle 1. The vehicle 1 can thus acquire different set of data points of the car 20 for different point cloud frames at different times (two point cloud frames are illustrated with the car 20 and the vehicle 1 respectively in solid lines and in dash lines on FIG. 6).

By acquiring data points of the object 20 according to different views, it is possible to obtain a partial, or even total, three-dimensional (3D) reconstruction of the object 20.

3D reconstruction can be useful for obtaining more detailed information or features concerning the object 20.

Such 3D reconstruction information can thus be combined or compared with material composition of the object 20 obtained thanks to the method described above.

As an example, if the 3D reconstruction of the object 20 permit to determine that the object is a car, it can be expected the body of this car to be mainly made of metal. It can then be checked whether this information is consistent with the material composition obtained from the reflectivity response of the object.

Similarly, additional information can be useful to discriminate between the different parts of the object: the tires, the body, the windows and the like, when it comes to a car.

Advantages

Thanks to the above, it is possible to obtain the composition material of an object 20 although the vehicle 1 is moving relative to the object 20 during the implementation of the method. This allows time-multiplexed, real time and efficient processing of the reflection of multispectral physical signals.

This is rendered possible even though the object is moving, because the method according to the present disclosure permits to determine the location of the object in a global cumulated map at different times (each time corresponding to the generation of a point cloud frame).

The method can be implemented even though the relative positions and orientations between the sensors are unknown.

The vehicle 1 can implement the method in any known driving conditions, for instance during daytime or nighttime, in various weather conditions, in various road conditions, etc.

As stated above, the timeframe of the point cloud frames is determined and/or managed by the central processing unit 13. This way, there is no need to communicate with a remote server for instance that would be located outside of the vehicle 1.

Besides, the successive physical signals emitted by the sensor 11 for the respective point cloud frames can be selected randomly.

A random selection permits to prevent any interference with other physical signals 16 that could be emitted by other vehicles or devices in the environment E. The system 10 is thus safer and robust against fake signals that could undermine the security and integrity of the vehicle for instance.

As a variant, the successive physical signal 16 emitted by the sensor 11 for the respective point cloud frames can be selected in a predetermined order.

For instance, the wavelength of the emitted physical signal 16 for a point cloud frame can depend on the reflected physical signal 17 acquired for a previous point cloud frame. As an example, if the reflected response 17 acquired for the previous point cloud frame is characteristic of an object either made of paper or fabric, the wavelength of the emitted physical signal 16 for the point cloud frame should be selected so as to discriminate specifically between these two materials.

More generally, the wavelengths of the successive emitted signals 16 can be selected so as to converge toward a probability threshold above which material composition of the object 20 is considered to be determined. Such convergence can be implemented by using any classification method, such as a decision tree.

As will be well understood by those skilled in the art, the several and various steps and processes discussed herein to describe the disclosure may be referring to operations performed by a computer, a processor or other electronic calculating element that manipulate and/or transform data using electrical phenomenon. Those computers and electronic elements may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and described merely exemplary embodiments of the present disclosure. One skilled in the art will readily recognize from such discussion and from the accompanying drawings and claims that various changes, modifications, and variations can be made therein without departing from the spirit and scope of the disclosure as defined in the following claims.

The invention claimed is:

1. A method for identifying a material composition of an object located in an environment surrounding at least one device, the object moving relative to the device, in which at least one sensor is mounted on the device and communicates with at least one central processing unit, wherein:
   /A/ the sensor generates a point cloud frame of a continuous stream by emitting a physical signal at a first wavelength, wherein the point cloud frame comprises a set of data points, at least one data point comprising coordinates of the object in a local volume surrounding the sensor at time $t_j$ in a local coordinate system of the sensor, said data point also comprising an intensity value of a reflected physical signal corresponding to the emitted physical signal once reflected on the object,
   /B/ the central processing unit receives the point cloud frame and determines the coordinates of each data point of the point cloud frame in a global coordinate system of the environment surrounding the device, the intensity value being associated with the coordinates of each data point in the global coordinate system,
   /C/ the central processing unit determines the coordinates of the object at time $t_j$ in the global coordinate system,
   /D/ the central processing unit stores in a memory the coordinates of the object in the global coordinate system at time $t_j$,
   steps /A/ to /D/ are repeated with the sensor or another sensor generating another point cloud frame by emitting another physical signal at another wavelength, at time $t_{j+1}$, so that at least two intensity values are associated to coordinates of the object in the global coordinate system at two different times,
   /E/ the central processing unit determines a reflectivity response of the object from the at least two intensity values, and
   /F/ the central processing unit identifies the material composition of the object, wherein the central processing unit determines the coordinates of each data point of the point cloud frame in the global coordinate system of the environment surrounding the device by:
      comparing the point cloud frame with a global cumulated tridimensional map of the environment to determine an aligned point cloud frame in the global coordinate system, and
      updating the global cumulated tridimensional map by merging the aligned point cloud frame with the global cumulated tridimensional map.

2. Method according to claim 1, wherein the central processing unit determines the coordinates of the object at time $t_j$ in a global coordinate system by:
   comparing the point cloud frame with a global cumulated tridimensional map of the environment to determine an aligned point cloud frame in the global coordinate system, and identifying a set of data points of the point cloud frame that cannot be aligned in the global coordinate system, so that this set of data points corresponds to the moving object.

3. Method according to claim 1, also comprising an additional step of obtaining a three-dimensional reconstruction of the object from the coordinates of the object in the global coordinate system and generated at at least two different times.

4. The method according to claim 1, wherein the sensor comprises at least one emitter and at least one receiver, the emitter being configured to emit a physical signal and the receiver being configured to receive the emitted physical signal once reflected on the object.

5. The method according to claim 4, wherein the sensor comprises the emitter and the receiver as a single unit.

6. The method according to claim 1, wherein the central processing unit identifies the material composition of the object by comparing the reflectivity response determined at step /E/ with reference reflectivity responses of known materials stored in a library.

7. The method according to claim 1, wherein the wavelengths of the physical signals emitted for the point cloud frames are selected in a random manner.

8. The method according to claim 1, wherein the wavelengths of the physical signals emitted for the point cloud frames are selected in a predetermined order.

9. The method according to claim 1, wherein the device comprises a plurality of sensors, wherein the sensors can respectively generate a point cloud frame by emitting a physical signal at a wavelength comprised in different spectral domains.

10. The method according to claim 9, wherein the sensors all communicate wirelessly with the central processing unit.

11. The method according to claim 1, wherein a point cloud frame corresponds to a full scan of the local volume of the sensor.

12. The method according to claim 1, wherein the coordinates of the object in the local coordinate system of the sensor comprises two angular coordinates and one radial coordinate.

13. The method according to claim 12, wherein the radial coordinate corresponds to the distance from the sensor to the data point ($M_i$), the distance being computed by comparing timing of the emitted physical signal and the reflected physical signal.

14. The method according to claim 1, wherein steps /A/ to /D/ are repeated at least four times, so that at least four intensity values are associated to coordinates of the object in the global coordinate system.

15. The method according to claim 1, wherein the physical signal is a laser signal.

16. The method according to claim 1, wherein the device is a vehicle able to move in the environment.

17. A system for identifying the material composition of an object located in an environment surrounding at least one device, the object moving relative to the device, the system comprising:
a plurality of sensors configured to be mounted on said at least one device, each sensor of the plurality of sensors being configured to generate a continuous stream of point cloud frames, in parallel and asynchronously with the other sensors of the plurality of sensors, by emitting a physical signal at a first wavelength, and at least a second wavelength, wherein the point cloud frame comprises a set of data points, each data point comprising coordinates of the object in a local volume of the environment surrounding the sensor at time $t_j$ in a local coordinate system of the sensor, each data point also comprising an intensity value of a reflected physical signal corresponding to the emitted physical signal once reflected on the object,
a central processing unit configured to communicate with each sensor to continuously receive the continuous streams of successive point cloud frames from each sensor, determine the coordinates of each data point of the point cloud frame in a global coordinate system of the environment surrounding the device, determine the coordinates of the object in the global coordinate system at the time $t_j$,
wherein the central processing unit determines the coordinates of each data point of the point cloud frame in the global coordinate system of the environment surrounding the device by:
comparing the point cloud frame with a global cumulated tridimensional map of the environment to determine an aligned point cloud frame in the global coordinate system, and
updating the global cumulated tridimensional map by merging the aligned point cloud frame with the global cumulated tridimensional map,
wherein the central processing unit is configured to store in a memory the intensity value and the coordinates in the global coordinate system, for at least the first wavelength and the second wavelength,
the central processing unit being configured to determine a reflectivity response of the object from the intensity values and to identify the material composition of the object.

18. An autonomous or semi-autonomous vehicle comprising a system according to claim 17.

19. A non-transitory computer readable storage medium, having stored thereon a computer program comprising program instructions, the computer program being loadable into a central processing unit of the system according to claim 17 and configured to cause the central processing unit to determine the coordinates of each data point of the point cloud frame in the global coordinate system.

20. A method for identifying a material composition of an object located in an environment surrounding at least one device, the object moving relative to the device, in which at least one sensor is mounted on the device and communicates with at least one central processing unit, wherein:
/A/ the sensor generates a point cloud frame of a continuous stream by emitting a physical signal at a first wavelength, wherein the point cloud frame comprises a set of data points, at least one data point comprising coordinates of the object in a local volume surrounding the sensor at time $t_j$ in a local coordinate system of the sensor, said data point also comprising an intensity value of a reflected physical signal corresponding to the emitted physical signal once reflected on the object,
/B/ the central processing unit receives the point cloud frame and determines the coordinates of each data point of the point cloud frame in a global coordinate system of the environment surrounding the device, the intensity value being associated with the coordinates of each data point in the global coordinate system,
/C/ the central processing unit determines the coordinates of the object at time $t_j$ in the global coordinate system,
/D/ the central processing unit stores in a memory the coordinates of the object in the global coordinate system at time $t_j$, steps /A/ to /D/ are repeated with the sensor or another sensor generating another point cloud frame by emitting another physical signal at another wavelength, at time $t_{j+1}$, so that at least two intensity values are associated to coordinates of the object in the global coordinate system at two different times, /E/ the central processing unit determines a reflectivity response of the object from the at least two intensity values, and /F/ the central processing unit identifies the material composition of the object, wherein the central processing unit determines the coordinates of the object at time $t_j$ in a global coordinate system by:

comparing the point cloud frame with a global cumulated tridimensional map of the environment to determine an aligned point cloud frame in the global coordinate system, and identifying a set of data points of the point cloud frame that cannot be aligned in the global coordinate system, so that this set of data points corresponds to the moving object.

21. A method for identifying a material composition of an object located in an environment surrounding at least one device, in which at least one sensor is mounted on the device and communicates with at least one central processing unit, wherein:

/A/ the sensor generates a point cloud frame of a continuous stream by emitting a physical signal at a first wavelength, wherein the point cloud frame comprises a set of data points, at least one data point comprising coordinates of the object in a local volume surrounding the sensor at time $t_j$ in a local coordinate system of the sensor, said data point also comprising an intensity value of a reflected physical signal corresponding to the emitted physical signal once reflected on the object, /B/ the central processing unit receives the point cloud frame and determines the coordinates of each data point of the point cloud frame in a global coordinate system of the environment surrounding the device, the intensity value being associated with the coordinates of each data point in the global coordinate system, /C/ the central processing unit determines the coordinates of the object at time $t_j$ in the global coordinate system, /D/ the central processing unit stores in a memory the coordinates of the object in the global coordinate system at time $t_j$, steps /A/ to /D/ are repeated with the sensor or another sensor generating another point cloud frame by emitting another physical signal at another wavelength, at time $t_{j+1}$, so that at least two intensity values are associated to coordinates of the object in the global coordinate system at two different times, /E/ the central processing unit determines a reflectivity response of the object from the at least two intensity values, and /F/ the central processing unit identifies the material composition of the object, wherein the central processing unit determines the coordinates of each data point of the point cloud frame in the global coordinate system of the environment surrounding the device by:

comparing the point cloud frame with a global cumulated tridimensional map of the environment to determine an aligned point cloud frame in the global coordinate system, and updating the global cumulated tridimensional map by merging the aligned point cloud frame with the global cumulated tridimensional map.

* * * * *